US012810516B1

(12) United States Patent
Grigoreva et al.

(10) Patent No.: US 12,810,516 B1
(45) Date of Patent: Nov. 24, 2026

(54) SYSTEM AND METHOD FOR SPLIT-RENDERING OF GRAPHICAL OBJECTS IN MOTION

(71) Applicant: Slimao Limited, Nicosia (CY)

(72) Inventors: Anna Grigoreva, Abu Dhabi (AE); Artem Galeev, Paphos (CY); Gleb Bezborodov, Abu Dhabi (AE); Igor Poldiaev, Paphos (CY); Konstantin Lyasota, Tbilisi (GE); Lev Denisovich, Abu Dhabi (AE); Oleg Gorodishenin, Abu Dhabi (AE); Robert Bagratuni, Paphos (CY); Sergey Chusov, Abu Dhabi (AE); Viktor Borisov, Yerevan (AM); Vlad Adamkovich, Abu Dhabi (AE); Yana Vyacheslavova, Abu Dhabi (AE)

( * ) Notice: Subject to any disclaimer, the term of this patent is extended or adjusted under 35 U.S.C. 154(b) by 344 days.

(21) Appl. No.: 18/602,417

(22) Filed: Mar. 12, 2024

(51) Int. Cl.

| | |
|---|---|
| ***G06T 13/20*** | (2011.01) |
| ***G06T 15/20*** | (2011.01) |
| ***G06T 17/10*** | (2006.01) |
| ***G06T 17/20*** | (2006.01) |

(52) U.S. Cl.
CPC .............. *G06T 13/20* (2013.01); *G06T 15/20* (2013.01); *G06T 17/10* (2013.01); *G06T 17/20* (2013.01)

(58) Field of Classification Search
CPC ......... G06T 13/20; G06T 15/20; G06T 17/10; G06T 17/20
See application file for complete search history.

(56) References Cited

U.S. PATENT DOCUMENTS

| | | | | |
|---|---|---|---|---|
| 11,055,810 B1 * | 7/2021 | Dhingra | G06T 1/20 | |
| 2003/0078098 A1 * | 4/2003 | Yamaguchi | A63F 13/45 | 463/30 |
| 2008/0043019 A1 * | 2/2008 | Sellers | G06T 15/10 | 345/427 |
| 2009/0009515 A1 * | 1/2009 | Tanaka | G06T 15/60 | 345/426 |
| 2010/0066760 A1 * | 3/2010 | Mitra | G06T 19/20 | 345/629 |
| 2012/0105602 A1 * | 5/2012 | McNamer | H04N 13/15 | 348/46 |
| 2018/0012400 A1 * | 1/2018 | Evans | G06T 17/00 | |
| 2020/0275073 A1 * | 8/2020 | Hamilton | H04N 13/161 | |
| 2020/0293556 A1 * | 9/2020 | Lysak | G06F 3/04845 | |
| 2022/0222885 A1 * | 7/2022 | Wang | G06T 1/20 | |
| 2023/0368537 A1 * | 11/2023 | Bhattacharjee | H04N 23/61 | |
| 2025/0095265 A1 * | 3/2025 | Garvey | G06T 15/04 | |

* cited by examiner

*Primary Examiner* — Xiao M Wu
*Assistant Examiner* — Latrell Anthony Creary
(74) *Attorney, Agent, or Firm* — Mohamed C. Azeez

(57) ABSTRACT

A method for rendering graphical objects within a cube-based gaming environment, said method comprising the steps of: assigning at least one graphical object to individualized tiles on the physical plane, each tile corresponding to a cluster within the graphical plane's cube space, where each cluster is uniquely indexed to capture the object's rendering attributes, including at least one of buffers and spatial coordinates; and adjusting at least one of a single or multi-camera within the physical plane to correspond with the movement of objects across the tiles, thereby rendering object motion within the cube space without the computational load of updating spatial data structures or recalibrating light and shadow effects.

28 Claims, 15 Drawing Sheets

SYSTEM AND METHOD FOR SPLIT-RENDERING OF GRAPHICAL OBJECTS IN MOTION

FIELD OF INVENTION

The invention pertains generally to the field of graphics rendering, and more particularly, to a cluster-indexed approach for rendering graphical objects in motion.

BACKGROUND OF INVENTION

In the realm of graphical rendering, the evolution from primitive vector graphics to today's hyper-realistic 3D environments marks a revolution fueled by relentless innovation. Early rendering techniques, such as wire-frame modeling, provided the foundational framework for the graphical interfaces we interact with daily. As technology progressed, rendering solutions became increasingly sophisticated, with rasterization leading the charge. This process, which converts vector graphics into a pixel-based image or raster image, was a significant leap forward, allowing for more complex and visually appealing graphics.

However, as the gaming industry and virtual simulations became more advanced, the demand for real-time rendering of objects in motion within three-dimensional spaces grew exponentially. Developers sought to create seamless and immersive experiences, pushing the boundaries of existing technology. Solutions like ray tracing emerged, offering unparalleled realism through the simulation of light paths, but at a substantial computational cost.

Despite these advances, the challenge of rendering objects in motion within dynamic environments persisted. Traditional methods often require each object's motion to be recalculated and re-rendered continuously, placing a significant strain on computational resources. This becomes even more pronounced in intricate scenes with numerous moving objects, where the graphical processing unit (GPU) must handle vast amounts of data to maintain real-time rendering.

The current state of graphics rendering, while impressive, still grapples with these limitations. The computational burden not only restricts the complexity of scenes but also impacts the performance, leading to a less than optimal user experience. The trade-off between visual fidelity and performance is a constant balancing act, often resulting in compromises that can detract from the overall quality of the graphical output.

There is, therefore, an evident void in the current landscape of graphics rendering-a need for an approach that can efficiently handle the rendering of objects in motion without the hefty computational load. Such a solution would not only revolutionize the way dynamic environments are rendered but also expand the possibilities for complexity and interaction within digital spaces. As we delve into the background of this application, we hint at a novel approach that leverages a cluster-indexed method, potentially heralding a new era in the field of graphical rendering.

SUMMARY

These and other features and improvements of the present application will become apparent to one of ordinary skill in the art upon review of the following detailed description when taken in conjunction with the several drawings and the appended claims.

In one exemplary aspect, the invention introduces a method for cluster-indexed rendering of graphical objects in motion, which represents a paradigm shift in the graphics rendering domain. The invention encompasses a sophisticated rendering technique utilizing a transformation matrix for each cluster. This matrix is meticulously constructed to represent the spatial interplay between the cluster's physical realm and its graphical representation. The transformation matrix is pivotal in enabling the precise calculation of graphical coordinates, ensuring that each object's position, scale, and orientation are systematically transitioned from the physical plane to the graphical plane.

In another aspect, the invention includes a transformation matrix for each cluster, enhancing the spatial coherence between the object's physical positioning and its graphical depiction. The matrix is fundamental to the process, translating each object's position, scale, and rotation from the physical to the graphical plane in real-time by adjusting the camera's view within the physical plane, instead of repositioning the graphical objects themselves. This camera dynamics controller operates based on the inverse of the transition matrix for each cluster, making the rendering of objects' motion more computationally efficient by eliminating the need to re-render objects as they move through various clusters.

In one aspect, the method reveals a novel approach to rendering motion by manipulating the camera view in relation to clusters, utilizing a transition matrix that is grounded in a mathematical model of space division and object positioning. This model serves as the backbone for the system, ensuring that the camera adjustments are precise and that the rendering reflects the true movement within the graphical space.

In one aspect, the method discriminates between static and dynamic objects within the clusters, offering tailored rendering management. Static objects are maintained within a single cluster, while dynamic objects are afforded the flexibility to move across clusters seamlessly.

In another aspect, the invention provides for the dynamic assignment and reassignment of objects to clusters. At each game frame, the system determines the physical cluster bounding box within which an object resides, assigning appropriate graphical and physical clusters and indexes for further dynamic management.

Further aspects of the method include a dynamic object management system, which handles the teleportation and reassignment of dynamic objects that are not initially positioned within a physical cluster. This system ensures that dynamic objects are initialized and transitioned smoothly between clusters, based on spatial calculations and without user-perceptible interruptions.

Furthering this innovation, the invention in one aspect also entails an intelligent system for determining the assignment of objects to physical clusters. This determination is made by leveraging mathematical points that represent proxy objects within the graphical space. This strategic placement of proxy objects aids in streamlining the teleportation process to neighboring clusters, significantly smoothing the visual transition and enhancing the overall rendering of the objects in motion.

In a more nuanced aspect, the invention incorporates a decision-making algorithm within the movement system of characters. This algorithm is activated post-movement to evaluate whether a character, including players, AI, or vehicles, requires teleportation. The decision is informed by a mathematical model of space division and the positioning of proxy objects, which serves as a cornerstone for maintaining a coherent and uninterrupted gaming experience.

In another aspect, the invention addresses the challenge of executing teleportation of dynamic entities between clusters in a way that is imperceptible to the player. This aspect is critical for maintaining the immersive qualities of the gaming experience, ensuring that the integrity of the visual and gameplay experience is not disrupted during cluster transitions.

An additional aspect of the invention is concerned with the preservation of the animation state of teleported characters. By maintaining the continuity of animation states across transitions, the invention ensures that there is no discernible visual break or anomaly that could distract the player or detract from the realism of the environment.

In one aspect, the invention significantly improves the post-teleportation experience by recalibrating the camera direction within the graphical space. This recalibration takes into account the relative rotational positions of the clusters involved in the transition, thereby maintaining the player's intended viewpoint and enhancing the perception of a continuous visual space.

Another aspect of the invention is the management of network-based predictions to mitigate positional discrepancies that may occur post-teleportation. This aspect is particularly pertinent in multiplayer environments, where maintaining the synchronicity of player movements across different clients and the server is essential for a fair and cohesive gameplay experience.

Lastly, the invention, in one of its aspects, provides detailed algorithms for non-player entities, such as projectiles or AI-controlled characters. These algorithms govern transitions between clusters in accordance with the established spatial division rules. By standardizing the teleportation process across all entities, the invention ensures a consistent behavior model for all dynamic elements within the visual medium, thereby promoting predictability and reliability in the interactive experience.

In an exemplary aspect, objects are individually processed with their own 'cameras'. A shader assigns a unique transformation matrix to each object, which is used in conjunction with the object's own matrix to establish its position within a cubic space prior to rendering. This technique, known as split-rendering, uses multiple 'cameras' and offers a significant advantage by negating the need for CPU-driven object movement, thus bypassing the resource-intensive updates to the octree and light/shadow caches required when objects change position.

This approach streamlines the rendering process by keeping each subscene or GPU cluster independent; moving a cluster does not necessitate recalculating object relationships or rebuilding the octree, as each object is rasterized using its dedicated camera. Consequently, a single render target suffices for any object's rendering, enhancing efficiency. This method offers a leap in rendering performance, particularly in dynamic scenes with frequent object movements, by maintaining stable graphical relationships within each cluster and reducing the need for complex recalculations, thereby accelerating rendering times and improving overall system performance.

At the core of this method lies the split-rendering pipeline, a system designed to manage graphical objects within a digital environment efficiently. This pipeline negates the requirement for constant updates to spatial data structures and the recalibration of light and shadow information, which are hallmarks of traditional rendering processes. Instead, it utilizes autonomous GPU clusters, where each cluster independently renders objects using a dedicated 'camera.' This not only simplifies the rendering workflow but also considerably diminishes the computational load, thereby ensuring a more fluid and responsive gaming experience.

In this enhanced environment, players navigate through a seamless virtual world where static and dynamic objects are cohesively integrated. Static structures, such as buildings, are presented to the player with impeccable depth and perspective, while their movement across the virtual landscape is rendered through a series of computational teleportations between discrete clusters. This approach maintains stable graphical relationships within each cluster, thereby preserving the visual continuity and realism of the game world. The result is a sophisticated, optimized rendering process that supports dynamic scene changes without sacrificing performance, setting a new benchmark for real-time rendering in interactive applications and enriching the overall user experience.

Further advantages and novel features of the invention will be set forth in part in the description that follows, and in part will become more apparent to those skilled in the art upon examination of the following or upon learning by practice of the invention.

BRIEF DESCRIPTION OF FIGURES

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which.

DETAILED DESCRIPTION

Figure 1A:
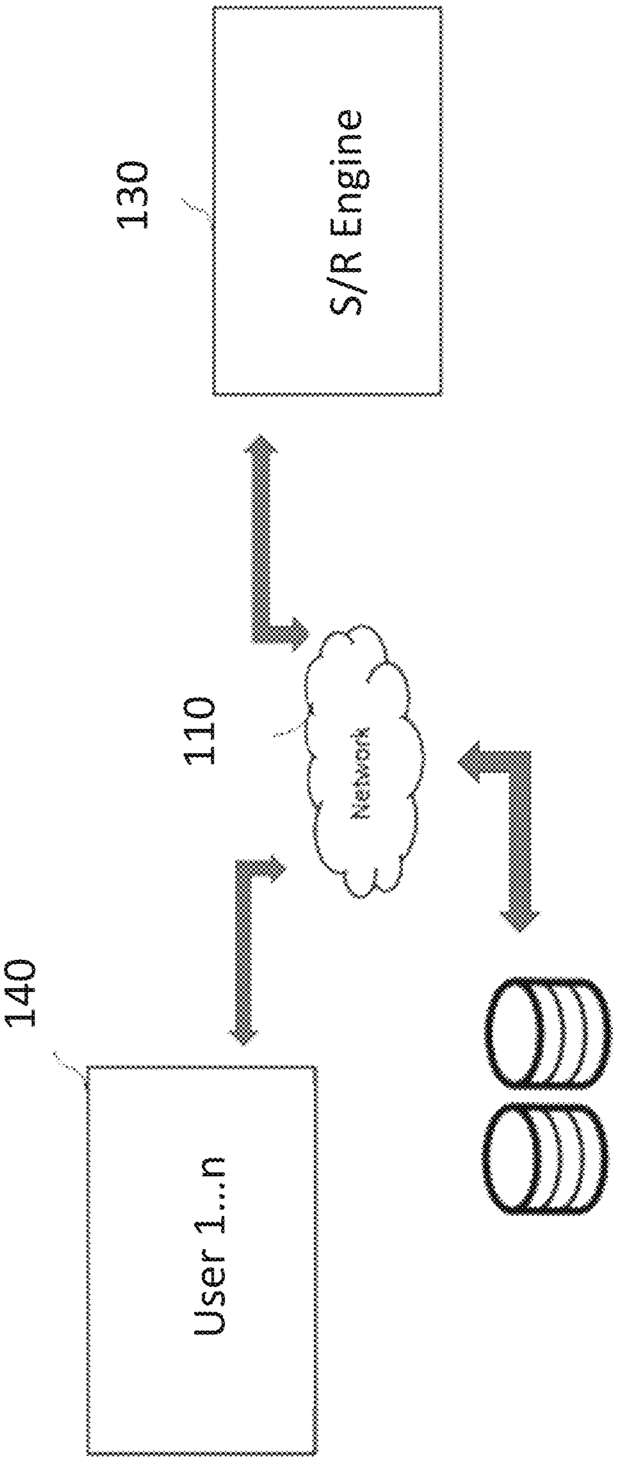
FIG. 1A depicts an exemplary network diagram in accordance with an aspect of the invention.

Numerous embodiments of the invention will now be described in detail with reference to the accompanying figures. The following description of the embodiments of the invention is not intended to limit the invention to these embodiments but rather to enable a person skilled in the art to make and use this invention. Variations, configurations, implementations, and applications described herein are optional and not exclusive to the variations, configurations, implementations, and applications they describe. The invention described herein can include any and all permutations of these variations, configurations, implementations, and applications.

In the following description, numerous specific details are set forth in order to provide a thorough understanding of the invention. It will be apparent, however, to one skilled in the art that the invention can be practiced without these specific details. Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The overarching objectives of the disclosed invention are to revolutionize the rendering process within interactive digital environments. Central to this innovation is the elimination of conventional rendering requirements, such as the continual updating of spatial organizational structures like the octree and the frequent recalibration of lighting and shadow caches. This advance is achieved through the implementation of a split-rendering pipeline.

At the heart of this pipeline is the concept of autonomous GPU clusters, each governing its designated segment. Such autonomy allows for a singular 'camera' viewpoint to render each object, streamlining the rendering process by significantly mitigating the computational demands traditionally placed on the system. The result is a marked increase in the fluidity and reactivity of the gameplay experience.

By introducing this method, the invention achieves a new level of efficiency, particularly suited for environments that are subject to dynamic changes. It ensures that the graphical interrelations among objects within each cluster remain consistent, irrespective of the objects' movements or alterations within the digital space. This consistency is key to providing an uninterrupted and seamless visual experience, which is essential for maintaining the illusion of a continuous world and for enhancing the user's immersion. The split-rendering technique, therefore, not only optimizes the rendering process but also redefines the standards for real-time graphical rendering in interactive applications.

Exemplary Network

FIG. 1A illustrates a network diagram of the split-rendering pipeline or system (S/R). The networked environment includes the S/R engine 130, and a user 140. The S/R engine 130, and the user 140 are communicatively coupled through a network 110.

In an exemplary embodiment, the network 110 facilitates communication between modules, namely the S/R engine 130, and networked entities to graphically illustrate motion of graphical objects in a point-of-view- or otherwise-gaming environment. The S/R engine 130, through this interconnected framework, is responsible for the dynamic rendering of objects within the gaming environment, ensuring seamless integration of the objects' movements and interactions. This is achieved by utilizing a distributed computational approach where rendering tasks are divided and managed effectively, thereby optimizing the graphical output and enhancing the user's immersive experience. The user 140, interacting via the network 110, experiences the gaming environment with minimal latency and high fidelity, as the S/R engine 130 processes and relays the graphical data in real time, adapting to the user's actions and inputs to maintain a consistent and engaging virtual ecosystem.

In continuing reference to FIG. 1A, the network 110 may be any suitable wired network, wireless network, a combination of these or any other conventional network, without limiting the scope of the present invention. Few examples may include a LAN or wireless LAN connection, an Internet connection, a point-to-point connection, or other network connection and combinations thereof. The network 110 may be any other type of network that is capable of transmitting or receiving data to/from host computers, personal devices, mobile phone applications, video/image capturing devices, video/image servers, or any other electronic devices. Further, the network 110 is capable of transmitting/sending data between the mentioned devices. Additionally, the network 110 may be a local, regional, or global communication network, for example, an enterprise telecommunication network, the Internet, a global mobile communication network, or any combination of similar networks. The network 110 may be a combination of an enterprise network (or the Internet) and a cellular network, in which case, suitable systems and methods are employed to seamlessly communicate between the two networks. In such cases, a mobile switching gateway may be utilized to communicate with a computer network gateway to pass data between the two networks. The network 110 may include any software, hardware, or computer applications that can provide a medium to exchange signals or data in any of the formats known in the art, related art, or developed later.

Exemplary Environment

Figure 1B:
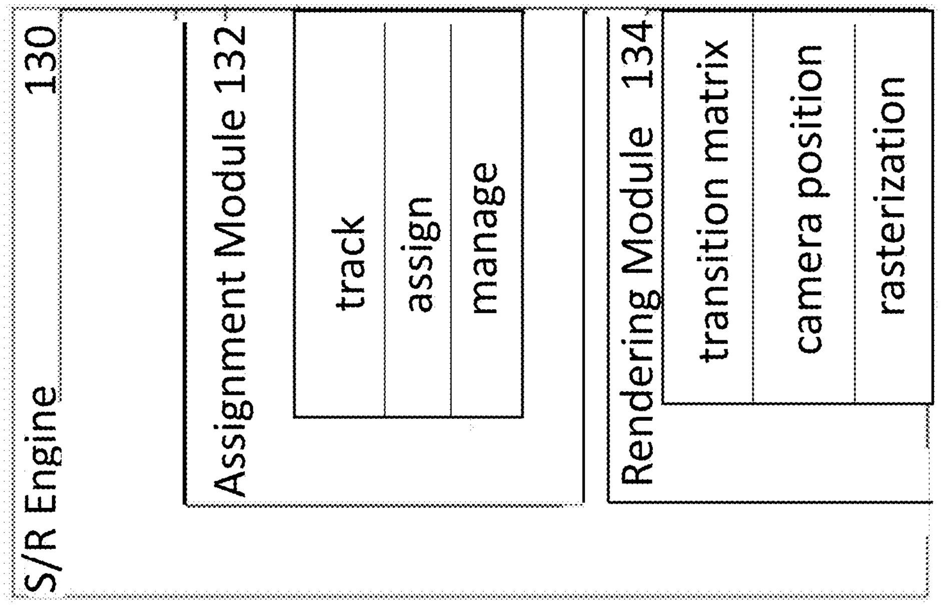
FIG. 1B depicts an exemplary system block diagram in accordance with an aspect of the invention.
Figure 2:
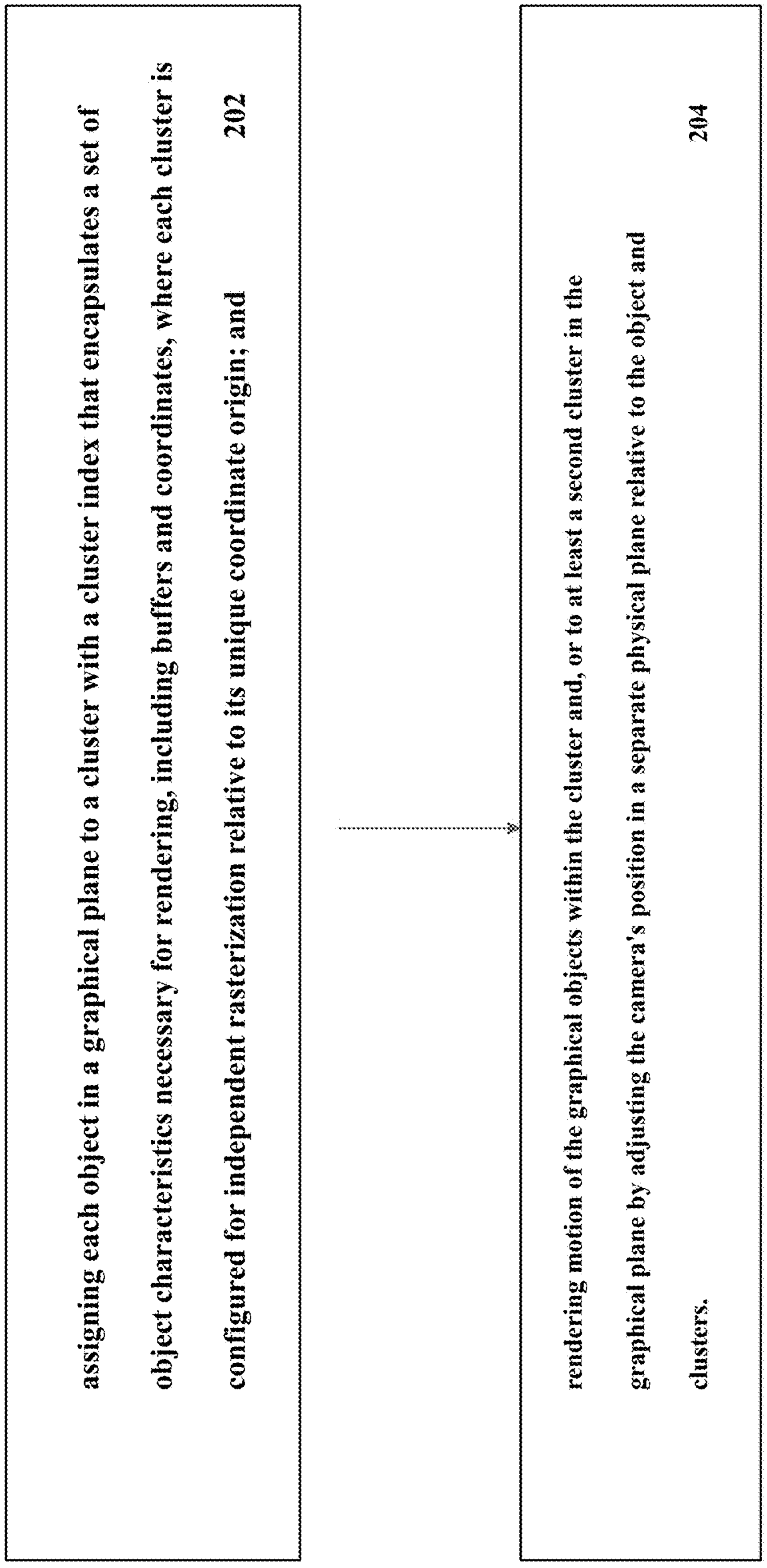
FIG. 2 depicts an exemplary method flow diagram in accordance with an aspect of the invention.

Now in reference to FIGS. 1B and 2, which depicts an exemplary system block diagram of the S/R Engine 130 and an exemplary method flow diagram of the S/R pipeline, respectively. The Split-Rendering (S/R) System 130, as detailed in FIGS. 1B and 2, employs a method for the split-rendering of graphical objects. The first step of the method involves using an assignment module (132) to assign each object in a graphical plane to a cluster with a specific index-denoted as step 202 in the method flow. This index encompasses essential object characteristics for rendering, such as buffers and coordinates. The clusters are configured for independent rasterization, with each having a unique coordinate origin for rendering purposes.

Following assignment, the rendering module (134) orchestrates the motion of graphical objects within a cluster and, or to at least a second cluster in the graphical plane by adjusting the camera's position in a separate physical plane relative to the object and clusters 204. This is achieved by adjusting the camera's position in a separate physical plane, allowing for movement within the same cluster or transition to another cluster. Interaction within planes, or across planes (physical and, or graphical) may be achieved by a superimposed, side-by-side, or individual layer interaction. The system utilizes a transformation matrix for each cluster, facilitating accurate translation of object properties from the physical to the graphical plane.

The transition matrix, fundamental to the system's operation, is based on a sophisticated mathematical model of space division and object positioning. Each cluster of static objects, like buildings and plants, is assigned a unique transition matrix to move from the physical to the graphical stage, using the formula T(graphics)=T(physics)*M. Clusters are independently rasterized, with dynamic objects like the player navigating cluster spaces in the physical scene. This model ensures that the camera view is moved accurately within the physical space to reflect the intended motion of the objects in the graphical space, providing a high-fidelity rendering of objects in motion.

This rendering process accommodates both static and dynamic objects. Static objects remain within their original cluster, while dynamic objects can move across clusters. The static and dynamic objects are managed by an object management system, which reassigns them as needed when they move outside their physical cluster boundaries.

One skilled in the art should appreciate that the allocation and organization of modules, subsystems, or higher-level abstractions within a system can be versatile, allowing for a range of configurations and implementations. It is crucial to note that while the designation and arrangement of these components may vary, the core functionality and specific attributes of each module or subsystem remain consistent and defined. This versatility in design and organization accommodates diverse system architectures, offering flexibility in how the overall system is structured while ensuring that the specific functions and capabilities of each module or higher-level abstraction are maintained regardless of the chosen configuration. For instance, object management may be a submodule or unit logically and schematically grouped under the assignment module 132, or the rendering module 134 instead, without impacting its function and role in the pipeline to reassign objects when they move from a first cluster to a second cluster.

Figure 3:
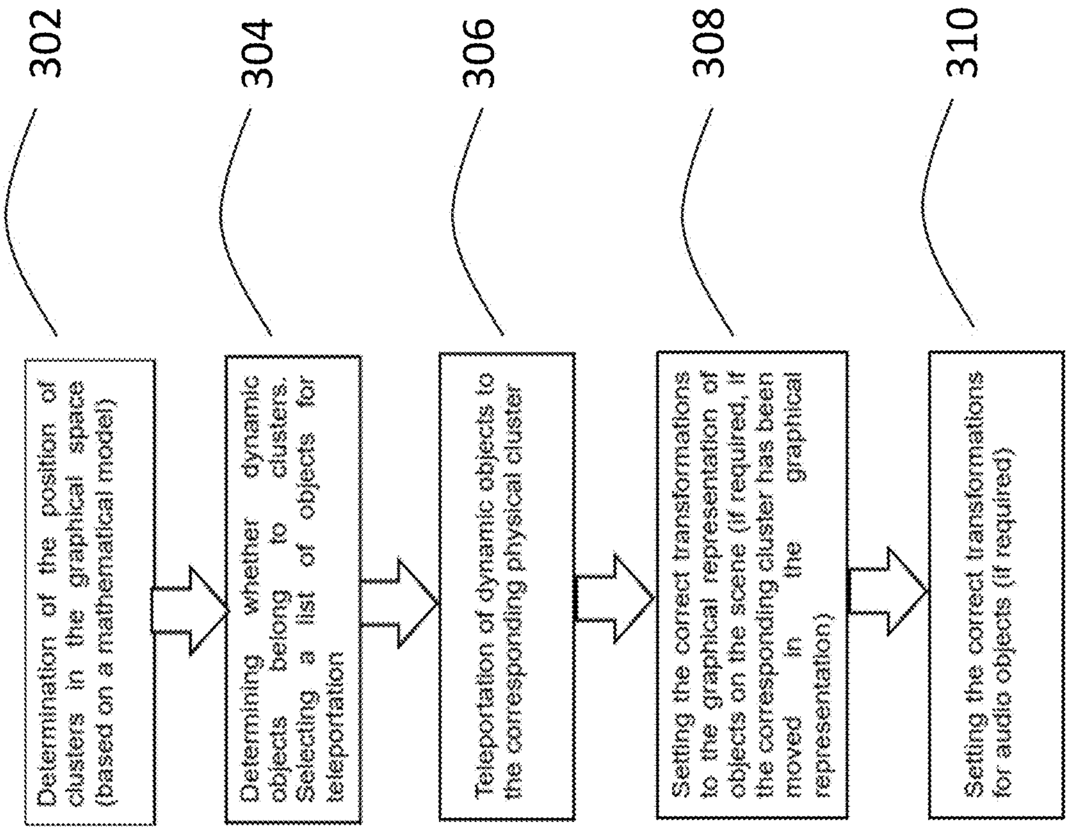
FIG. 3 depicts an exemplary process flow diagram in accordance with an aspect of the invention.

Now in reference to FIG. 3, which illustrates an exemplary split-rendering flow, each object within a graphical plane is assigned to a cluster equipped with a unique index, encapsulating essential object characteristics such as buffers and coordinates required for rendering, as indicated at step 302. This assignment is predicated on the object's position within the graphical plane, guided by a mathematical model that governs the space division and positioning of objects.

Following assignment, the objects are rendered in motion, either within their assigned cluster or transitioning to a subsequent cluster, which is facilitated by adjusting the camera's position within a distinct physical plane relative to the clusters, as portrayed at step 304. This camera adjustment is critical, enabling the visualization of object movement without necessitating the re-rendering of the objects themselves, thus reducing computational load. This is achieved by utilizing a transformation matrix for each cluster, as shown at step 306, which systematically translates the position, scale, and rotation of objects from the cluster's physical plane to the graphical plane.

In a preferred embodiment, the rendering module 134 manages the rendering process, ensuring that static objects are confined to movement within their cluster, while dynamic objects may transition between clusters. This dynamism is supported by determining which physical cluster bounding box the object inhabits at each game frame, thereby assigning a graphical and physical cluster and index to the object, as seen at step 308.

Further, the system includes a dynamic object management system depicted at step 310. This system oversees the movement of dynamic objects, facilitating their transition from one cluster to another, which may include teleportation for objects positioned outside the physical clusters. The management system ensures that such transitions are seamless and consistent with the environmental context of the visual medium, reinforcing the fluidity and continuity of the rendered motion.

Figure 4:
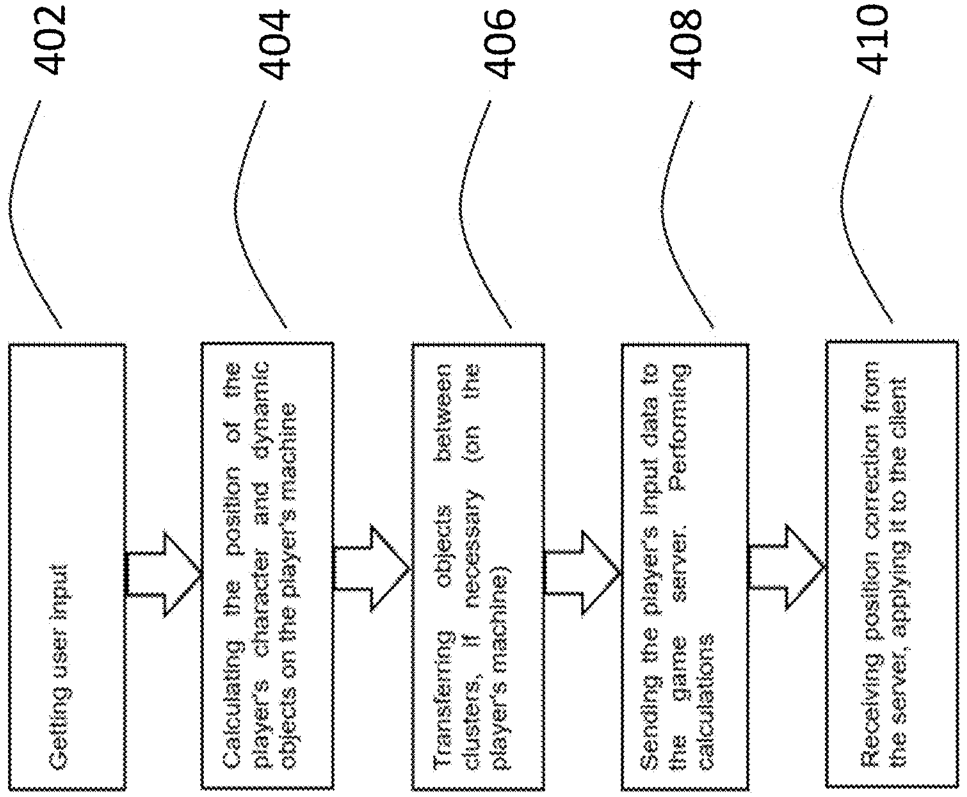
FIG. 4 depicts an exemplary process flow diagram in accordance with an aspect of the invention.

In an embodiment of the system, as shown in FIG. 4, the initial stage involves capturing user input (402), which forms the basis of interaction within the gaming environment. This critical step translates the player's commands into in-game movements and decisions, bridging the gap between the player's strategy and the character's response.

Following the acquisition of user input, the system proceeds to calculate the spatial positioning of the player's character and any dynamic elements present on the gaming canvas (404). This calculation is performed within the confines of the user's hardware, allowing for an instantaneous adaptation of the game's visual feedback to the player's maneuvers. When gameplay necessitates, the subsequent phase includes the transference of objects between different clusters, a process that is managed locally on the user's device (406). This operational step ensures the logical coherence of object interactions, honoring the game's spatial rules and enhancing the player's sense of control and immersion.

The workflow then expands its scope to encompass server-client communication, wherein the player's input data is sent to the game server for additional processing (408). This server-level computation is critical for ensuring consistency in a multiplayer setting, where numerous player actions and game states must be synchronized across different devices. The culmination of this sequence is the reception and application of positional corrections from the server back to the player's device (410).

Figure 5B:
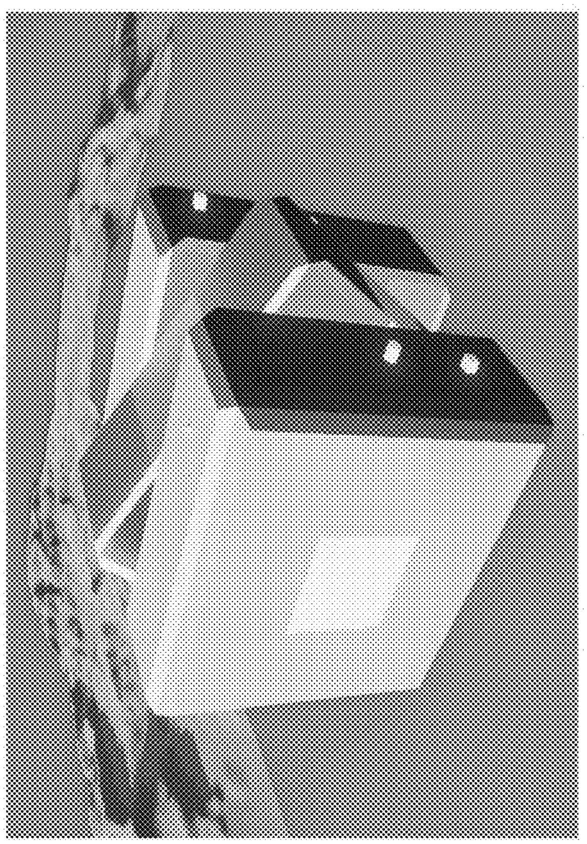
FIG. 5*b* depicts an exemplary schematic in accordance with an aspect of the invention.
Figure 5A:
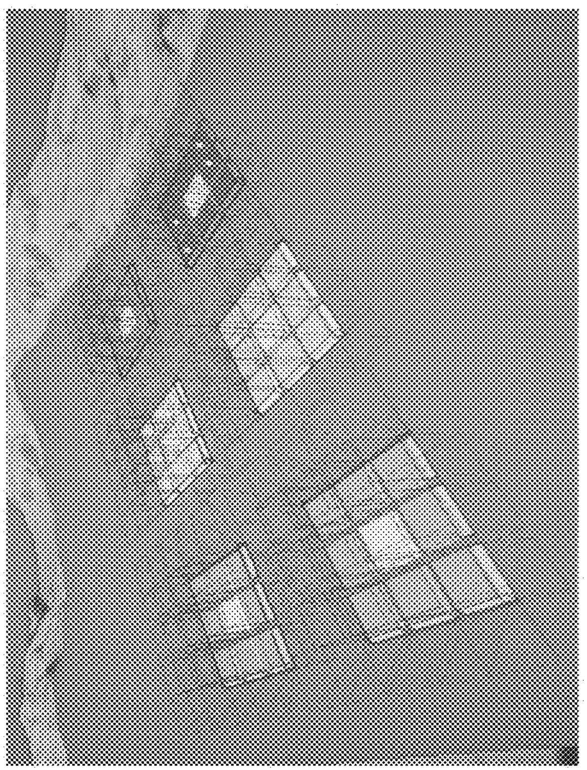
FIG. 5*a* depicts an exemplary schematic in accordance with an aspect of the invention.

FIGS. 5*a* and 5*b* each illustrate exemplary gaming environments implementing the split-rendering technique for graphical object motion/teleportation. In a preferred embodiment, the split-rendering technique designed to complement the implementation of the "Atomic Cube," a digital world closely resembling a Rubik's cube. Within the Atomic Cube, this technique facilitates the rendering and manipulation of graphical objects, ensuring a seamless integration with the cube's unique characteristics.

The Atomic Cube constitutes a three-dimensional environment, featuring individual tiles reminiscent of the segments on a Rubik's cube. Notably, this environment introduces a unique gravitational behavior where gravity is always aligned with the current tile's normal vector. Additionally, objects within a moving tile remain unaffected by the tile's motion, preserving their inertial frame of reference. In this context, the Split-Rendering technique emerges as a critical component, ensuring that graphical objects within the Atomic Cube are rendered and manipulated consistently.

Preferred embodiments of the Atomic Cube typically encompass a cubic world of variable size, with the classic 3×3 cube serving as a prime example. Within this structure, the cube is meticulously divided into 54 segments, each referred to as a "tile." What sets the Atomic Cube apart is that players have complete freedom to navigate these tiles, regardless of cube rotations or movements. This sense of freedom is preserved through the unique gravitational behavior, where gravity always aligns with the current tile's normal vector.

To facilitate a better understanding of the technical aspects, certain key terminologies are introduced. "Flat Space" refers to the logical and physical representation of the Atomic Cube, akin to a conceptual cube sweep (FIG. 5A). Conversely, "Cube Space" represents the graphical aspect, embodying the visual representation of the Atomic Cube (FIG. 5B). In addition, "Proxy Objects" are mathematical points within the Cube Space, serving as crucial reference points for tracking movement and positioning. Lastly, the "Proxy Cube" is a networked mathematical model of the Atomic Cube, enabling digital representation.

The core concept underlying the Split-Rendering technique lies in the separation of graphical representation from the physical and logical aspects of the game engine. This separation is instrumental in enabling moving objects to operate cohesively within the same plane, known as "segments," while still presenting them visually on the cube's surface.

Within the Atomic Cube, static objects such as houses and benches are seamlessly integrated. During level editing, each tile is assigned a unique number, and this assignment plays a pivotal role during object loading. The render module utilizes this information to determine the necessary transformation matrix, ensuring a smooth transition of static objects from flat space to cube space. This transformation guarantees that static objects blend seamlessly into the cubic environment, enhancing realism.

To monitor object movement within the Atomic Cube, a tracking mechanism based on "proxy objects" is employed. These proxy objects' positions are precisely calculated based on the transformations of their respective owner objects and the transformation matrices of the tiles they occupy. This tracking ensures the seamless movement and positioning of objects within the game world.

Within the mathematical model of the cube, the space is partitioned into segments, resembling the space above each tile and extending slightly beyond. Based on the spatial relationship between objects and these segments, the game determines the appropriate tile to which an object should be moved within flat space. Subsequently, teleportation mechanisms smoothly transport objects to their new locations.

Rendering efficiency is a critical consideration within the Atomic Cube's implementation. To streamline the rendering process and eliminate the need for frequent addition and removal of objects, the game scene is divided into multiple sub-scenes. Each sub-scene operates independently, updating its content autonomously. This approach significantly enhances rendering performance. To ensure that only relevant objects are rendered and visible to players, multiple cameras are deployed, with each sub-scene independently handling clipping. This technique guarantees that players experience a visually coherent and uncluttered gaming environment, contributing to a seamless gaming experience.

Firstly, each object within the graphical plane is systematically assigned to a designated cluster. These clusters are equipped with a cluster index, encapsulating a comprehensive set of object characteristics vital for rendering, encompassing critical elements like buffers and coordinates. Significantly, each cluster is thoughtfully configured to engage in independent rasterization, preserving its unique coordinate origin.

Central to this innovative method is the dynamic manipulation of the camera's position within a distinct physical plane relative to the graphical objects and clusters. This camera-based adjustment is the linchpin for rendering the motion of graphical objects within their respective clusters and, intriguingly, facilitating transitions to secondary clusters within the graphical plane.

The assignment of objects to clusters and their corresponding indices hinges on their precise positions within the graphical plane. These positions are meticulously determined through a mathematical model, which governs both the spatial division and positioning of objects.

Each cluster boasts its transformation matrix, systematically translating the objects' position, scale, and rotation from their native physical plane into the graphical plane. This transformation process ensures that objects seamlessly adapt to the visual environment. The camera's dynamic adjustment is executed by harnessing the inverse of the transition matrix in the physical plane. This calculated adjustment precedes the rendering of object movement, be it within a cluster or the transition to a secondary cluster in the graphical plane.

The distinction between static and dynamic objects is crucial. Static objects remain confined within a cluster, while their dynamic counterparts exhibit more intricate behavior by moving within their native cluster or transitioning to at least a second cluster. The assignment of both static and dynamic objects is achieved by meticulously determining the physical cluster bounding box that houses the object at each new frame, thus ensuring precise placement within the clusters.

Furthermore, the dynamic object management system facilitates the seamless transfer of assigned dynamic objects between clusters. This system orchestrates the reassignment of clusters, a pivotal component in managing dynamic objects' movement.

Figure 6A:
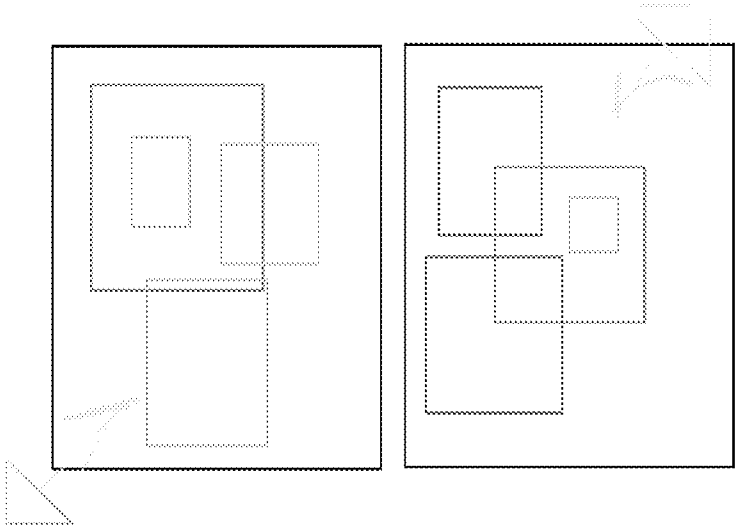
FIG. 6*a* depicts an exemplary schematic in accordance with an aspect of the invention.
Figure 6B:
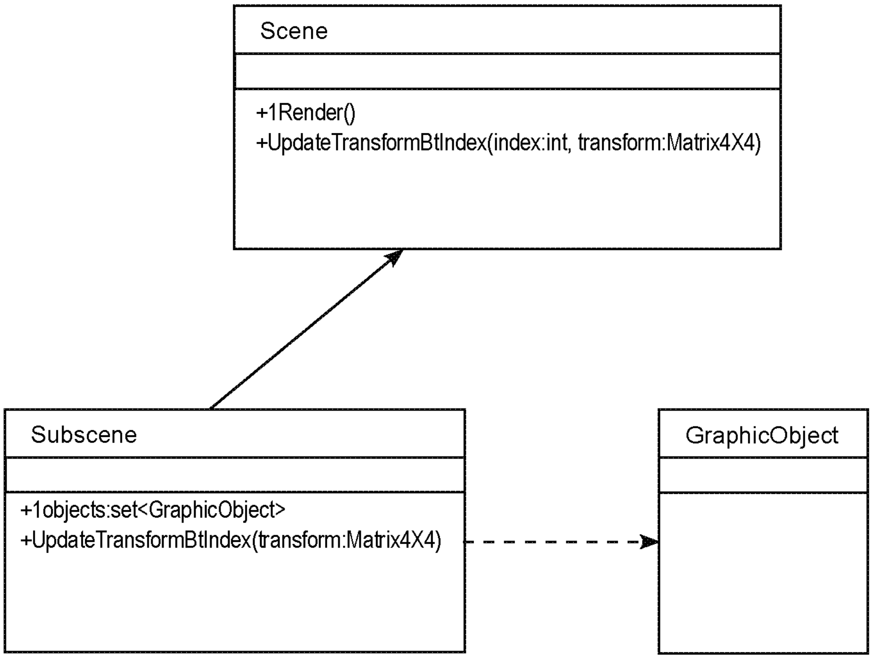
FIG. 6*b* depicts an exemplary schematic in accordance with an aspect of the invention.

FIGS. 6A and 6B each detail a high-level schematic of an exemplary S/Rendering pipeline, in accordance with an aspect of the invention. FIG. 6A introduces a novel partitioning of the GPU scene into virtual segments, establishing a method wherein each object destined for rendering is systematically organized according to its coordinates within a defined cubic space. This organization is pivotal as it dictates the rendering sequence. As the rendering process commences for a particular object, it is viewed through a bespoke camera perspective—this effect is simulated by the shader program, which selects a supplementary transformation matrix unique to the object based on an index. This matrix is then algebraically merged with the object's own transformation matrix to ascertain its definitive location within the cubic framework. The importance of this locational data cannot be overstressed, as it is fundamental to the ensuing rendering phase. To support this, a set of transformation matrices, which transmute the planar representations to the cubic configuration, are transmitted to the GPU in anticipation of each graphical cluster's rendering, thereby optimizing the rendering workflow.

Each object is rendered individually with its associated 'camera'. This is accomplished by the shader selecting a unique transformation matrix for each object based on an index, which is then multiplied by the object's own matrix to determine its position in the cube space before rendering. The primary advantage of this approach is that it eliminates the need for objects to be moved by the CPU, thereby avoiding the costly operations associated with updating the octree structure as well as the light and shadow caches. In traditional rendering processes, moving an object requires removing it from the octree, clearing the associated caches, and then re-inserting it into the octree at the new position, followed by a rebuild of the caches. This process can be computationally intensive and can negatively impact rendering performance. By using the described feature-split-rendering with multiple 'cameras'—each subscene or GPU cluster operates within its own boundaries. When an entire cluster is moved, there is no need to update the relationships between objects within it, meaning the octree does not need to be rebuilt. Each object within the cluster is rasterized using its individual camera.

This implies a significant optimization in rendering, as it allows for the use of a single render target for any object, regardless of its movement within the scene. This results in a more efficient rendering process that can potentially reduce the processing load on the system, speed up the rendering of complex scenes, and improve overall performance. It simplifies the handling of dynamic scenes where objects are frequently moving, as the graphical relationships within each cluster remain constant, and it reduces the need for recalculating spatial hierarchies and lighting effects, which are often the bottlenecks in real-time rendering.

In contrast, the second approach, as illustrated in FIG. 6B-serving as an alternative to the GPU-centric method-engages the capabilities of the central processing unit (CPU) for the manipulation of object rotations. Unlike the GPU method which relies on the graphics hardware to manage spatial segmentation, this approach delegates the task to the CPU. It accomplishes this by dissecting the larger scene into subcomponents, referred to as subscenes, each containing an array of graphic primitives awaiting rendering. With each update to a subscene's position, there is a parallel and meticulous adjustment of the transformation parameters for each object therein. This process is not isolated; it is intricately linked to the rendering timeline, ensuring that the transformations reflect the most current state of each object at the moment they are relayed to the GPU for rendering. The CPU-based method provides a more granular level of control over object manipulation, which can be particularly beneficial in scenarios where dynamic and computationally demanding updates are necessary. It enables a more programmable and flexible handling of object transformations, which may not be as easily achieved with GPU-based transformations, especially when dealing with complex or non-standard object motion paths.

Exemplary User Scenarios

FIG. 7-14B each illustrate exemplary user game-play scenarios in accordance with an aspect of the invention. These solutions operate on both the client-side (the player's device) and the server-side (the game server) to create a dynamic and visually stunning virtual world. One key technique that contributes to this experience is the division of game objects into distinct representations: visual, physical, and logical. This division, facilitated by the use of clusters, plays a pivotal role in rendering the game world.

In the gaming world, especially in scenarios with a multitude of static objects like buildings, plants, and more, the actual movement of these objects occurs solely in the graphical representation during the rendering process. This movement is orchestrated through the concept of clusters. A cluster is essentially a grouping of similar elements, or graphic objects, that can be treated as an independent unit. These elements may move together as a single unit or remain stationary.

Each cluster, which represents a set of objects, possesses its transition matrix, bridging the gap between its physical and graphical manifestations. To convert coordinates from the physical space of a cluster to the graphical space, a straightforward formula is employed: T(graphics)=T(physics)*M. This formula is instrumental in orchestrating the seamless transition of objects. The transition matrix itself often takes the form of a 3×3 matrix, enabling the transfer of coordinates between different reference frames. From the player's perspective, navigating the physical scene is akin to moving within the cluster space. Each segment of the graphical scene corresponds to a cluster and is situated on an independent GPU sub-scene. These GPU sub-scenes represent collections of object characteristics, such as buffers and coordinates, essential for rendering objects within the specific sub-scene. Importantly, each sub-scene is rasterized autonomously, relative to its unique coordinate origin. The movement of clusters within the graphical world is achieved by adjusting the camera's position relative to the sub-scene, allowing for the dynamic rendering of the game world.

To ensure players can enjoy a comprehensive gaming experience in a world divided into clusters, certain conventions are established. These conventions address the characteristics of game entities concerning their interaction with clusters. Game entities can be categorized as either static or dynamic. Static entities are unable to transition between clusters, whereas dynamic entities possess this capability.

The game's graphical space is divided into segments corresponding to the number of physical clusters. Each segment is assigned a specific cluster, and mathematical points representing object positions determine a dynamic object's affiliation with a physical cluster. This affiliation determination is unambiguous. When a dynamic entity approaches the boundary of a cluster, it seamlessly teleports to an adjacent cluster, ensuring that the player remains unaware of the transition.

Transitions between physical clusters can involve changes in the gravity vector, and in such cases, the gravity vector is interpolated. The specific interpolation conditions depend on the game's current situation. Game entities beyond the player's character, such as rockets, grenades, and mobs, follow their algorithms for transitioning between clusters, similarly relying on teleportation. The rules governing the division of space into clusters are consistent across all entities.

The solution to the challenge of spatial separation and object movement and, or teleportation is achieved through several interconnected systems:

Cluster Movement Model: This system defines the rules governing the movement of clusters within the game world. While the trajectory of cluster movement is not critical, the model's primary purpose is to determine the segment's position in the graphical space and calculate the transition matrix from physical space to graphical space.

Space Division System: This system segments space into clusters to determine object affiliation with a specific cluster. Each segment corresponds to a bounding box (BBox), a simple geometric figure like a parallelepiped that constrains the shape of more complex geometric models. Bounding boxes exist in both graphical and physical representations. Those in the physical representation track newly emerging objects, while those in the graphical representation monitor object transitions between clusters. These boxes move alongside clusters, and at every game frame, the system identifies which bounding box the player occupies in the graphical space, signaling any affiliation changes to the teleportation and rendering subsystems.

Object Teleportation System: This system allows both players and dynamic objects to transition seamlessly between clusters. It operates in a manner similar to other teleportation systems in gaming.

Render Subsystem Enhancements: The graphics CPU and GPU scenes are divided into clusters, each equipped with a transition matrix (M). To determine the position of cluster graphic objects in the graphical representation, the formula T(graphics)=T(physics)*M is utilized. However, instead of physically moving each object to the appropriate position, the camera's position is adjusted using the inverse matrix (M−1). This inverse matrix effectively counteracts the transition matrix (M), ensuring accurate rendering of each cluster. This camera adjustment occurs before rendering each cluster.

Physics Subsystem Improvement: To execute requests to the physical scene accurately while considering the game world's geometry, each request must be segmented in case of intersections with cluster boundaries. Raycasting can traverse several clusters, necessitating multiple raycasts on physical clusters.

In the context of this patent application, the interactions and relationships between various components are central to providing a seamless gaming experience. Players' Local Machines, representing player devices such as PCs or consoles, receive and update local in-game objects. The Game Server serves as the central authority in multiplayer gaming, receiving data from players and updating object positions globally. Additionally, the Machines of Other Players play a vital role in synchronizing the game world. The operational principle involves a continuous data exchange, starting with local data acquisition from users, which updates objects on their devices. This data is then transmitted to the game server, responsible for updating global object positions. Finally, the server sends updated data back to clients, allowing local machines to synchronize object positions, ensuring a consistent and harmonized gaming experience for all players.

Opting to move the camera position within the physical plane, rather than relocating objects within the graphical plane, introduces significant rendering efficiencies that profoundly benefit game development. These efficiencies can be attributed to underlying principles and critical factors. Shifting objects within the graphical plane necessitates continuous real-time recalculations and updates of object positions, orientations, and properties. This imposes a substantial computational burden on the CPU, particularly in scenes with numerous objects or complex physics interactions. In contrast, adjusting the camera's position primarily involves computationally less intensive matrix transformations. This computational simplicity allows the CPU to allocate more resources to essential tasks, stemming from the inherent efficiency of matrix operations like translation, rotation, and scaling.

Moving objects within the graphical plane can lead to increased memory usage due to the storage and updating of object-related data. In contrast, relocating the camera primarily involves managing simpler camera-related data, resulting in reduced memory requirements. This memory optimization translates to improved performance and less stress on hardware resources. Objects moving within the graphical plane often require frequent updates and re-rendering, potentially causing redundant computations and rendering passes. Adjusting the camera's position minimizes these redundancies. Objects within clusters or scenes are rendered once, with the camera's viewpoint adjusted to capture different perspectives. This streamlined rendering process results in improved frame rates and reduced rendering-related bottlenecks.

Moving the camera ensures seamless transitions between clusters or objects, creating a more natural and fluid gaming experience. Objects maintain visual consistency from the player's perspective as the camera smoothly tracks their motion. In contrast, moving objects in the graphical plane can lead to jarring transitions or glitches, disrupting player immersion. Choosing to move the camera position within the physical plane delivers rendering efficiencies by reducing computational overhead, optimizing memory usage, streamlining rendering pipelines, and enhancing visual consistency. These efficiencies arise from the computational simplicity of camera-related operations, reduced data complexity associated with camera properties, and consistent camera movements that preserve a seamless player experience. Ultimately, this approach maximizes the effective utilization of computational and memory resources, leading to a smoother and more efficient rendering process in game development.

In an embodiment, a cube-based gaming environment is rendered through a method where each graphical object is aligned with a designated tile in the physical plane, which in turn corresponds to a specific cluster within the graphical plane's cube space. In this setup, the in-game camera is dynamically adjusted within the physical plane to mirror the object's movements across the tiles, thereby streamlining the rendering of motion in the cube space. Alternatively, or in another embodiment, the environment may employ multiple cameras, each corresponding to different clusters or segments, to simultaneously track and render several objects or targets. This multi-camera, multi-target approach allows for a more complex and nuanced rendering of the game space, accommodating a richer interaction of objects and enhancing the overall depth and realism of the player's experience. Whether using a single camera for a focused view or multiple cameras for a broader rendering, this method efficiently negates the onerous computational demand typically associated with updating spatial data structures and recalibrating lighting and shadow caches, maintaining a consistent and responsive visual flow within the game.

Figure 7:
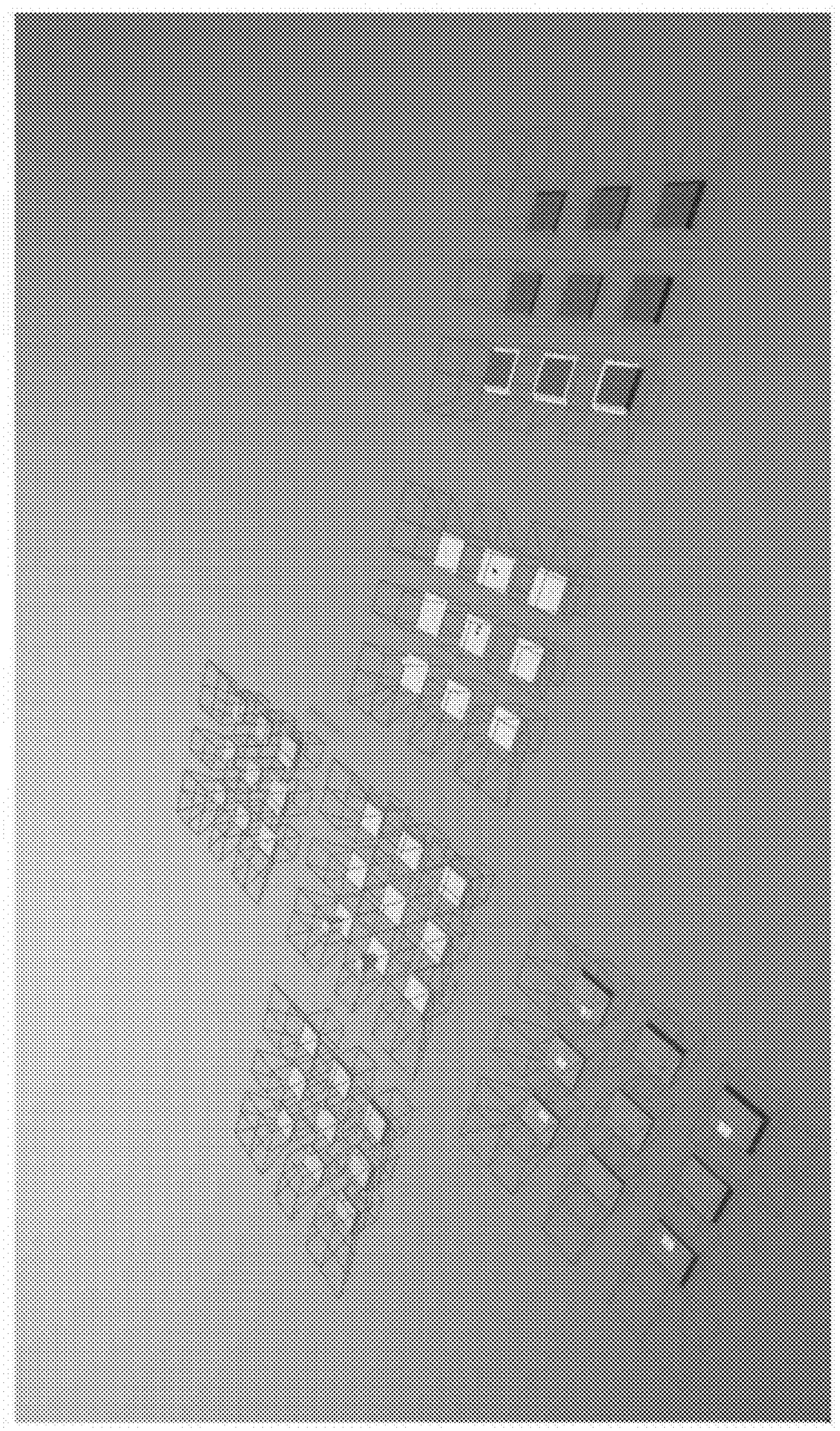
FIG. 7 depicts an exemplary user scenario in accordance with an aspect of the invention.
Figure 8:
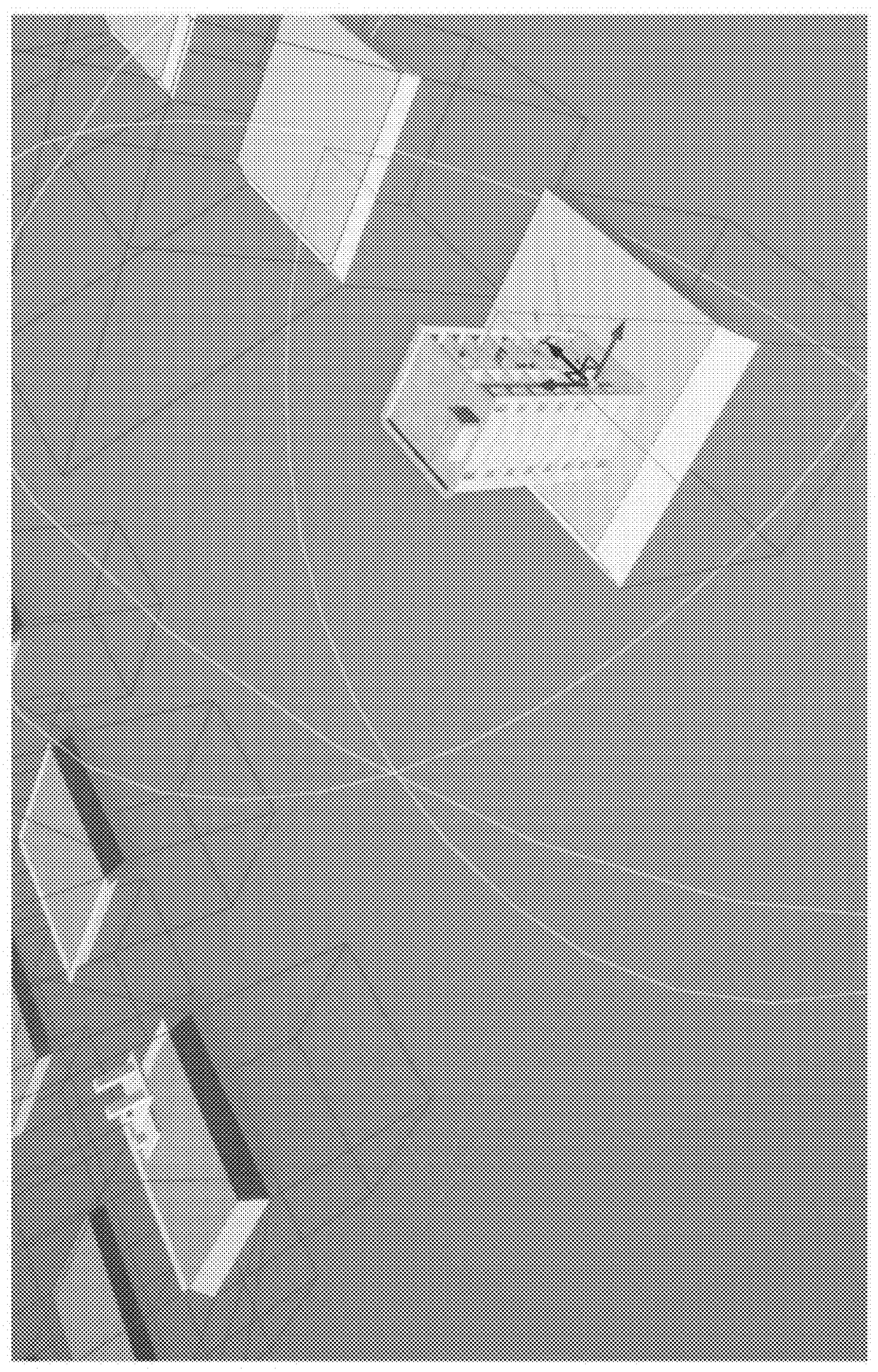
FIG. 8 depicts an exemplary user scenario in accordance with an aspect of the invention.

The sequence from FIG. 7 to FIG. 16 illustrate the split-rendering process in a cubic gaming environment. FIG. 7 establishes the foundational editing stage, where the virtual environment is prepared by merging graphical and physical planes for object loading for tracking/assigning and rendering. FIG. 8 introduces the concept of cluster boundaries, which are essential for assigning objects to specific zones or indexed-clusters, allowing for mapping and rendering.

Figure 9:
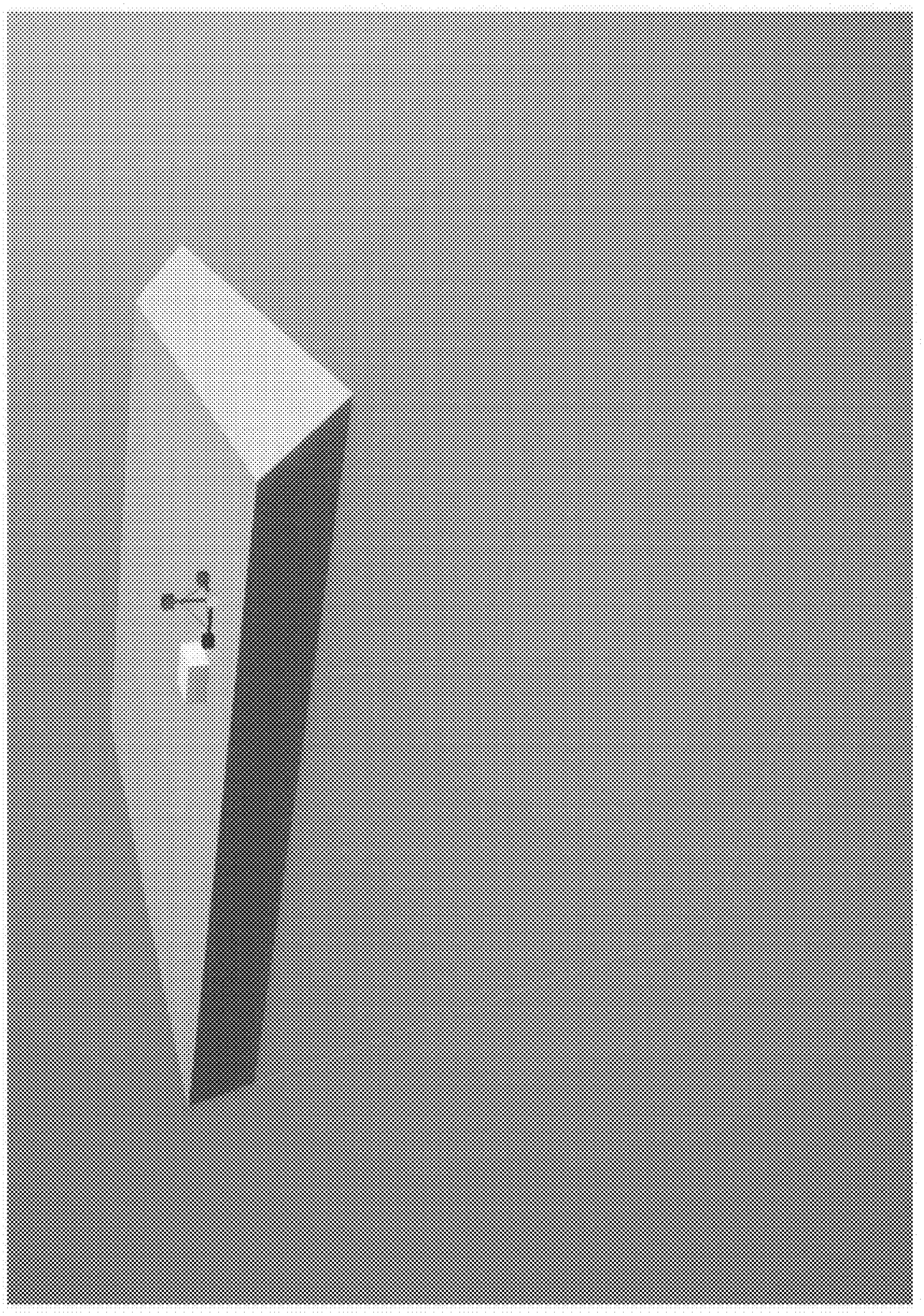
FIG. 9 depicts an exemplary user scenario in accordance with an aspect of the invention.
Figure 10:
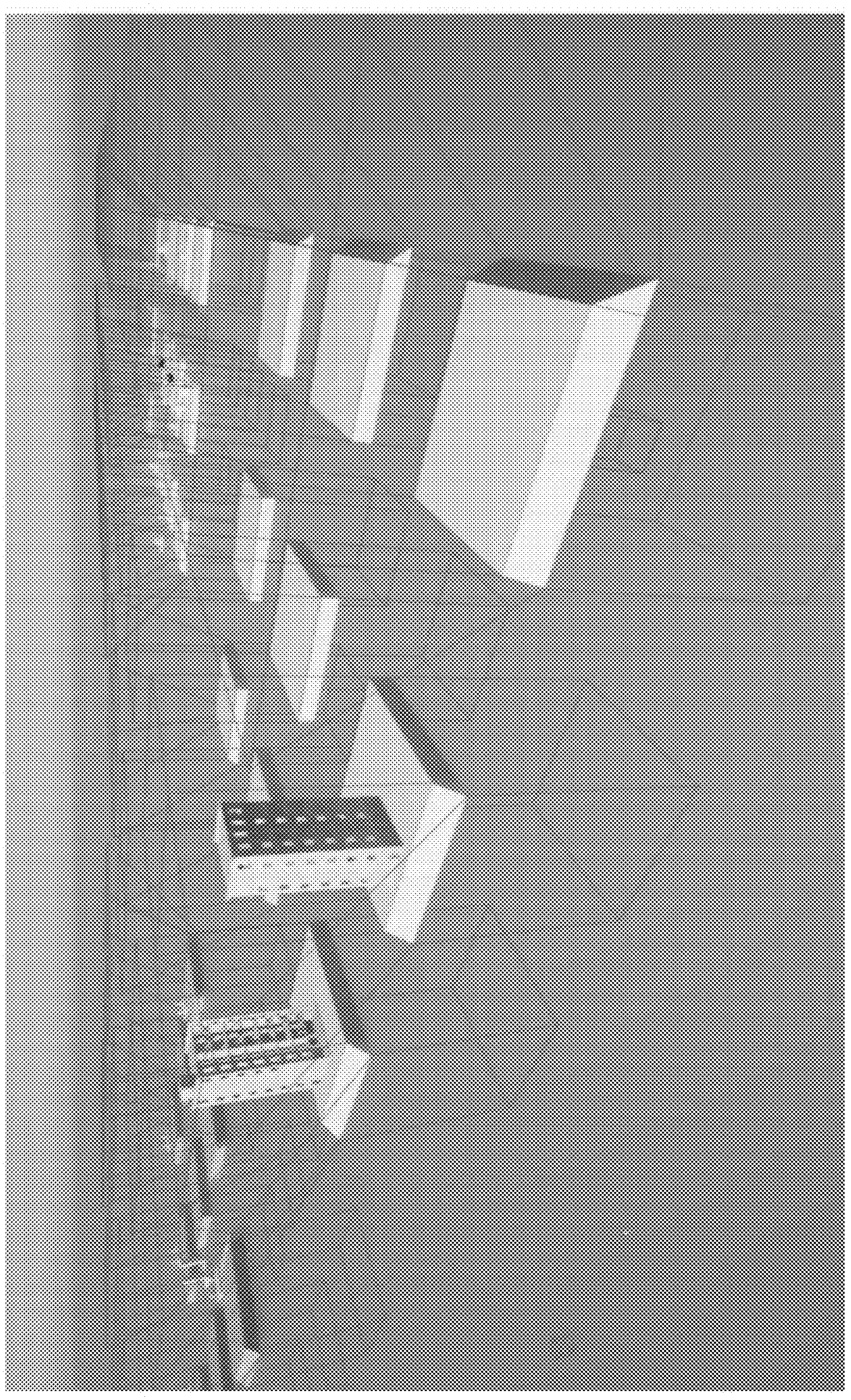
FIG. 10 depicts an exemplary user scenario in accordance with an aspect of the invention.
Figure 11:
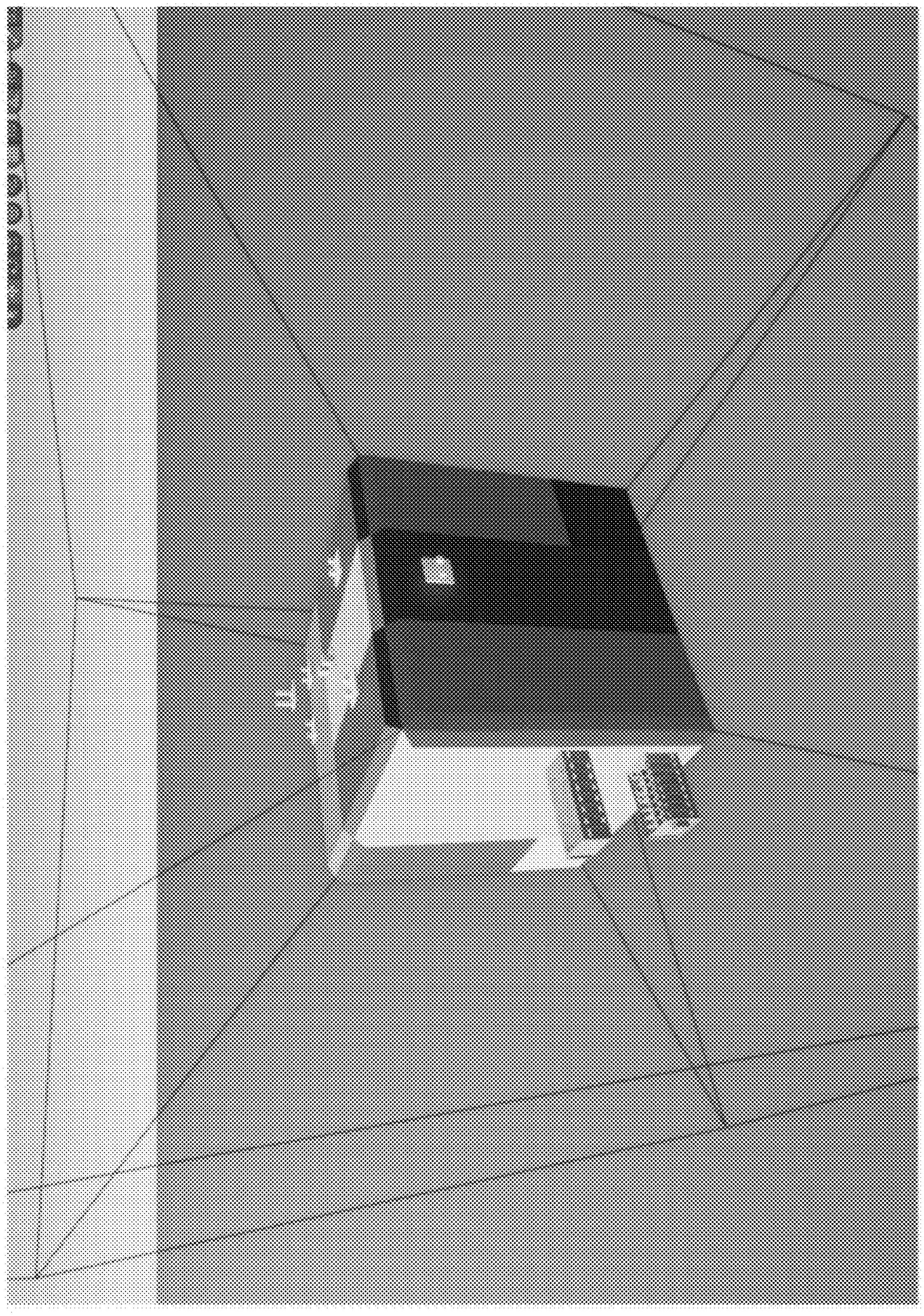
FIG. 11 depicts an exemplary user scenario in accordance with an aspect of the invention.
Figure 12:
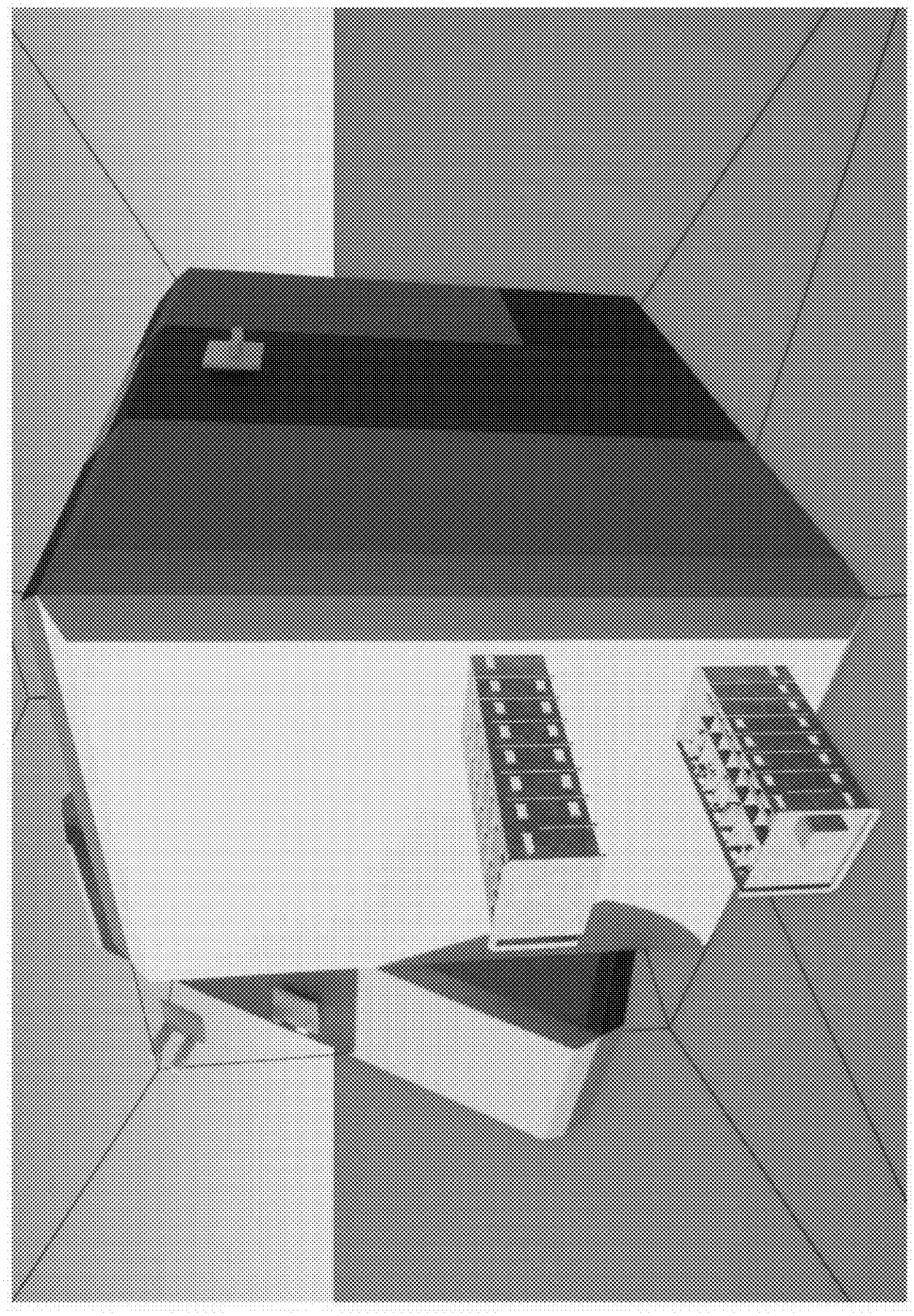
FIG. 12 depicts an exemplary user scenario in accordance with an aspect of the invention.

FIG. 9 reveals the mechanism of volume blocking, a preventive measure to ensure that the player remains within the intended gameplay area, while FIGS. 10 and 11 provide a perspective view of the world, and the assembled static world, respectively. FIG. 12 then shows the dynamic aspect of the game world, illustrating the effects of rotating world faces on gameplay and player perception.

Figure 13B:
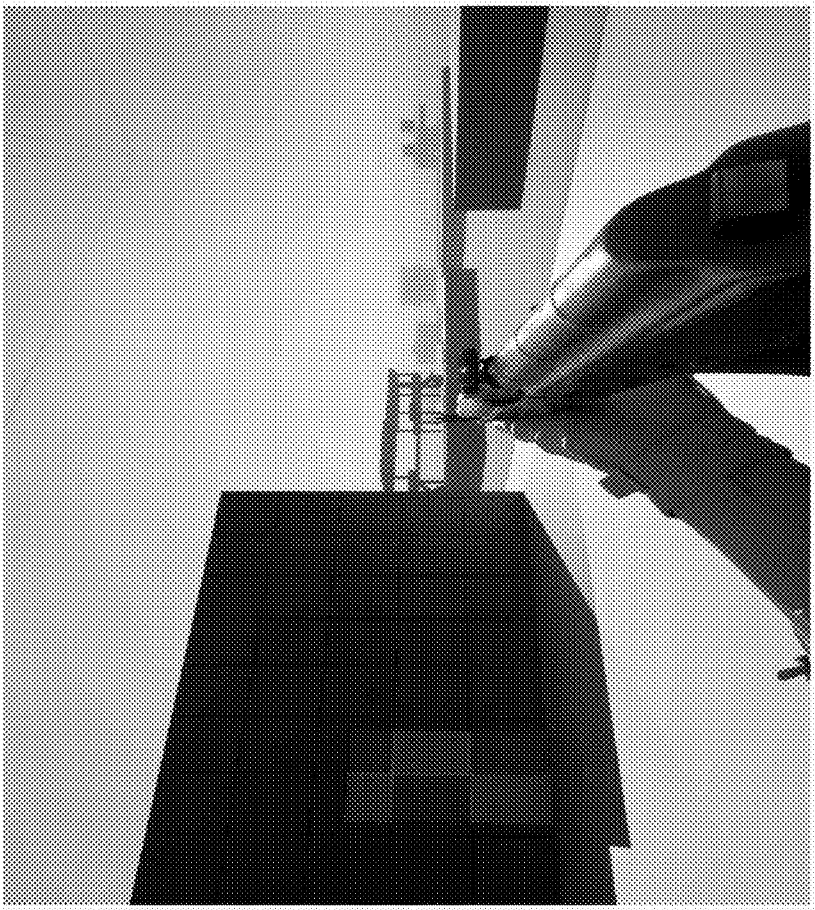
FIG. 13B depicts an exemplary user scenario in accordance with an aspect of the invention.
Figure 13A:
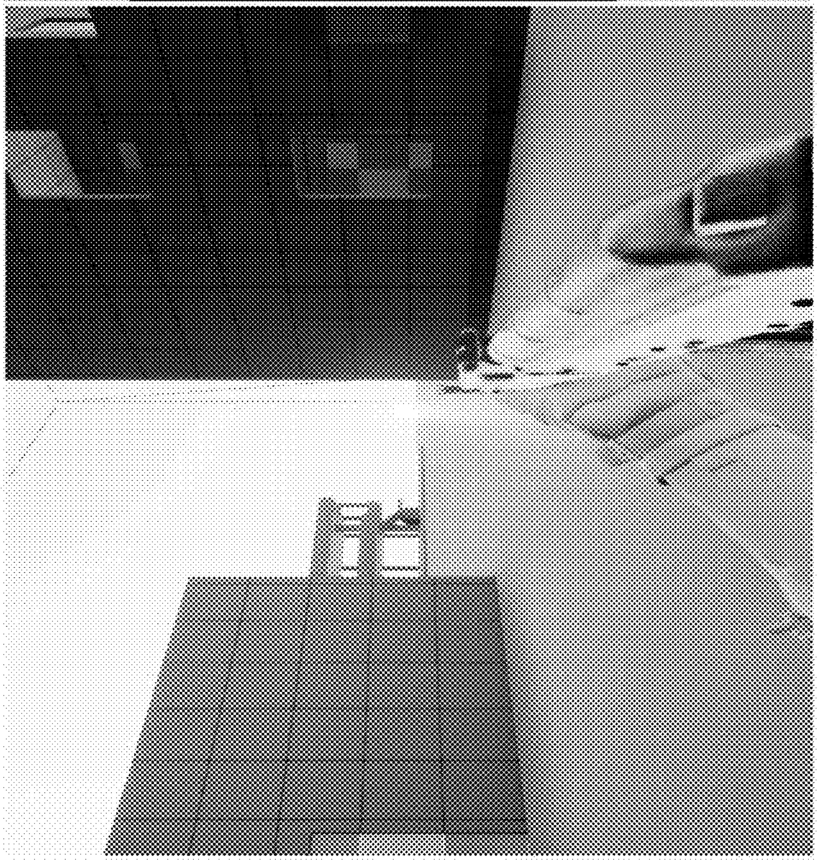
FIG. 13A depicts an exemplary user scenario in accordance with an aspect of the invention.

Now in reference to FIG. 13A, in one embodiment, a user navigates through a digital environment within the cube space, flanked by two static structures, notably buildings. This scene, as depicted, showcases the buildings in close proximity from the player's vantage point, suggesting an urban setting within the virtual world. In continuing reference to FIG. 13A, the spatial arrangement and visual rendering of these static objects are determined by their pre-sorted coordinates within the cube space, illustrating depth and perspective akin to the player's first-person view.

In reference to FIG. 13B, the corresponding physical plane is revealed, where the buildings observed in FIG. 13A are represented as rudimentary blocks. These blocks reside within their bounded clusters on distinct tiles, mirroring the scene's segmentation in the cube space. The player's avatar exists in this plane as a dynamic object, where its movement from one cluster to another is not a physical traversal but a computational transition facilitated by the game engine's teleportation mechanics.

Figure 14B:
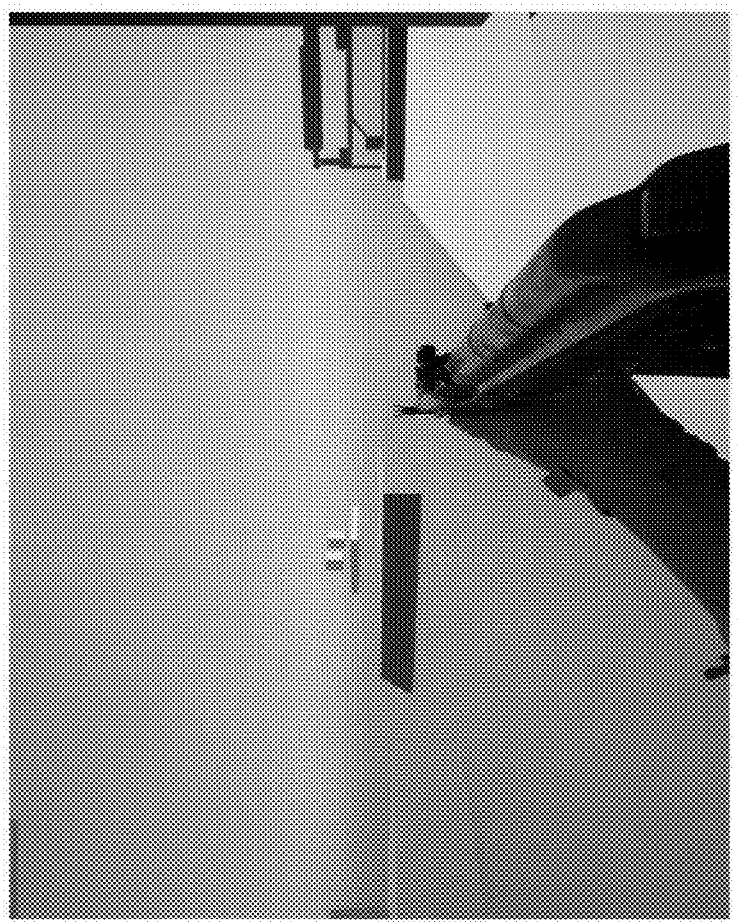
FIG. 14B depicts an exemplary user scenario in accordance with an aspect of the invention.
Figure 14A:
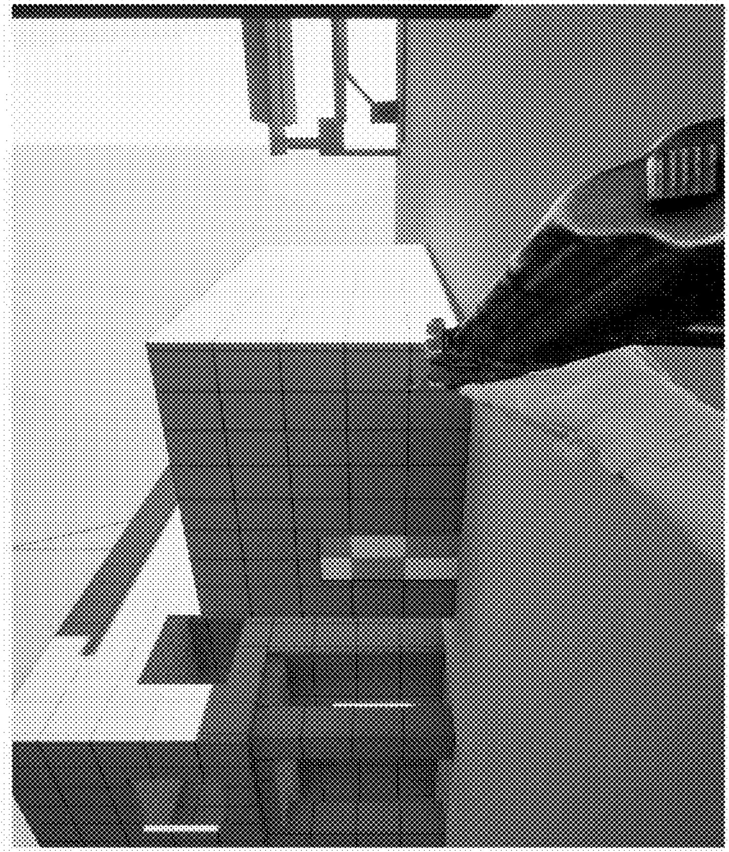
FIG. 14A depicts an exemplary user scenario in accordance with an aspect of the invention.

Transitioning to FIG. 14A, the same player is now depicted having moved closer to the second building, an action that is visually perceptible in the cube space by the enlarged and more detailed appearance of the building within the player's field of view. This proximity shift enhances the immersive experience, making the virtual world seem continuous and spatially consistent.

Finally, in reference to FIG. 14B, the physical plane illustrates this movement as a seamless teleportation. The player is relocated to a new cluster closer to the second building, negating the need for traditional rendering processes such as updating the octree or recalculating light and shadow caches. This efficiency is at the core of the split-rendering pipeline, where each GPU cluster independently manages its segment, allowing for the use of a single 'camera' per object. By employing this method, the rendering process becomes more efficient, significantly reducing the system's processing load and enhancing the responsiveness of the gameplay. This approach underscores the agility of the split-rendering technique, especially in dynamically changing environments, as it maintains stable graphical relationships within each cluster, providing an optimized and fluid gaming experience.

While this specification contains many specific execution details, these should not be interpreted as limitations on the scope of any inventions or of what may be claimed, but rather as descriptions of features specific to particular embodiments of particular inventions. Certain features that are described in this specification in the context of separate embodiments can also be implemented in combination in a single embodiment. Contrariwise, various features that are described in the context of a single embodiment can also be implemented and interpreted in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A method for split-rendering of graphical objects in motion, comprising the steps of:

assigning each object in a graphical plane to a cluster with a cluster index that encapsulates a set of object characteristics necessary for rendering, including buffers and coordinates, where each cluster is configured for independent rasterization relative to its unique coordinate origin;

rendering movement of the object within a first cluster or between the first cluster and a second cluster by moving a camera view in a physical space based on a transition matrix associated with the first cluster or the second cluster;

determining, after movement of the object, whether the object is to be teleported between clusters based on the mathematical model and the positions of the proxy objects;

in response to determining that teleportation is required, removing the object from an old cluster and adding the object to a new cluster within a single frame to maintain visual continuity; and assigning clusters to dynamic objects and managing movement of the dynamic objects between clusters using teleportation based on spatial calculations.

2. The method of claim 1, wherein assigning objects to a cluster and corresponding index is based on their position in the graphical plane represented by a mathematical model of the space division and position of objects.

3. The method of claim 1, further comprising a transformation matrix for each cluster, wherein the transformation matrix serves to systematically translate the position, scale, and rotation of objects from the cluster's physical plane to the graphical plane.

4. The method of claim 3, wherein the camera is adjusted using the inverse of the transition matrix in the physical plane prior to rendering movement of the objects within the cluster and/or to at least a second cluster in the graphical plane.

5. The method of claim 1, wherein the object is either static or dynamic, wherein static objects move within a cluster, while dynamic objects move within and/or to at least a second cluster.

6. The method of claim 5, wherein the static and/or dynamic object is assigned a graphical and physical cluster and index based by first determining which physical cluster bounding box the object is located in at each new frame.

7. The method of claim 6, further comprising transferring assigned dynamic objects to a dynamic object management system to manage movement from one cluster to at least a second cluster.

8. The method of claim 7, wherein the dynamic object is transferred to a dynamic object management system for initializing dynamic objects for cluster reassignment for dynamic objects outside of the physical cluster.

9. The method of claim 1, further comprising interpolating a gravity vector during transitions between physical clusters when a change in gravity is required by the game's mechanics.

10. The method of claim 9, wherein each physical cluster features a special floor layer with a dedicated physical collision channel to determine a gravity direction based on a normal vector.

11. The method of claim 9, further comprising checking the current floor post-movement and setting the character's movement system based on the determined gravity vector.

12. The method of claim 9, further comprising rotating the character to align with the determined gravity vector using the character's down vector and physics-based algorithms.

13. A method for split-rendering of graphical objects in motion, comprising the steps of:

assigning a graphical object to a first indexed-cluster of objects within a graphical space, wherein the first indexed-cluster is configured for independent rasterization relative to a unique coordinate origin associated with the first indexed-cluster; and rendering motion of the graphical object from the first indexed-cluster of objects to at least a second indexed-cluster of objects and/or within the first indexed-cluster of objects by dynamically adjusting a camera view relative to the first indexed-cluster and the second indexed-cluster in a physical space, instead of repositioning the graphical object within the graphical space, wherein the camera view is adjusted according to a transition matrix associated with the first indexed-cluster and/or the second indexed-cluster, and wherein the transition matrix is generated from a mathematical model of space division and object positioning to maintain cluster-relative rendering continuity during rasterization.

14. The method of claim 13, wherein the transformation matrix for each cluster represents a spatial relationship between the cluster's physical space and its corresponding graphical representation, enabling the precise calculation of graphical coordinates for objects within the cluster.

15. The method of claim 13, further comprising determining the assignment of objects to a physical cluster based on their position in the graphical space, facilitated by mathematical points representing the spatial location of proxy objects.

16. The method of claim 15, further comprising integrating a decision step in the movement system for characters to determine the necessity of teleportation after each character movement, based on the mathematical model of space division and proxy object positioning.

17. The method of claim 16, further comprising recalculating the camera direction within the graphical space after teleportation of a graphical representation of a user (player), based on the mutual rotation of the clusters involved in the transition.

18. The method of claim 16, further comprising adjusting the players momentum post-teleportation, considering the mutual rotation of the physical clusters involved.

19. The method of claim 16, further comprising recalculating the direction of movement specified by the player in the frame where the movement occurs.

20. The method of claim 16, further comprising accounting for network-based prediction of player movement on other clients and the server to avoid positional discrepancies post-teleportation.

21. The method of claim 16, further comprising managing network discrepancies when teleporting to or from a moving physical cluster to maintain synchronization across all clients.

22. The method of claim 16, further comprising the step of removing the graphical entity from the old cluster and adding it to the new cluster in a single frame to maintain visual continuity on the screen.

23. The method of claim 13, further comprising merging the graphical and physical clusters during the editing process to establish initial object coordinates within physical clusters.

24. The method of claim 13, further comprising initializing a dynamic object tracking system and a static object tracking system when the game begins, based on a mathematical model of space division.

25. The method of claim 13, further comprising assigning graphical and physical clusters to static objects loaded, with the assignment based on the object's coordinates and a simplified partitioning model.

26. The method of claim 13, further comprising assigning clusters to dynamic objects, whether initialized within physical clusters or outside, and managing their transitions and reassignments through a dynamic object control system that includes teleportation based on spatial calculations.

27. A method for rendering graphical objects within a digital environment, the method comprising the steps of:

allocating each graphical object to a specific cluster within a graphical plane, wherein each cluster possesses a unique index indicative of the object's rendering characteristics, such as buffers and coordinates, facilitating independent rasterization without the need for at least one of a traditional spatial data structure update or recalibration of lighting and shadow details; and rendering objects in motion, within their assigned cluster or transitioning to an adjacent cluster, by manipulating the camera's position within a distinct physical plane, which is independent of the object's motion.

28. A method for rendering graphical objects within a cube-based gaming environment, said method comprising the steps of:

assigning at least one graphical object to individualized tiles on the physical plane, each tile corresponding to a cluster within the graphical plane's cube space, where each cluster is uniquely indexed to capture the object's rendering attributes, including at least one of buffers and spatial coordinates; and adjusting at least one of a single or multi-camera within the physical plane to correspond with the movement of objects across the tiles, thereby rendering object motion within the cube space without updating spatial data structures or recalibrating light and shadow effects.

* * * * *